United States Patent [19]

Velasquez

[11] Patent Number: 4,520,408

[45] Date of Patent: May 28, 1985

[54] CLOCK SIGNAL SYNCHRONIZATION APPARATUS AND METHOD FOR DECODING SELF-CLOCKING ENCODED DATA

[75] Inventor: Juan F. Velasquez, Saline, Mich.

[73] Assignee: VSP Labs, Inc., Ann Arbor, Mich.

[21] Appl. No.: 468,645

[22] Filed: Feb. 22, 1983

[51] Int. Cl.³ .............................................. G11B 5/09
[52] U.S. Cl. ...................................... 360/51; 375/118
[58] Field of Search ................... 360/51; 375/110, 118

[56] References Cited

U.S. PATENT DOCUMENTS

| | | | |
|---|---|---|---|
| 3,537,082 | 10/1970 | Vallee | 340/174.1 |
| 3,831,195 | 8/1974 | Davis et al. | 360/51 |
| 3,852,811 | 12/1974 | Aghazadeh | 360/51 |
| 3,864,735 | 2/1975 | Davis et al. | 360/51 |
| 3,996,612 | 12/1976 | Fassbender | 360/40 |
| 4,009,490 | 2/1977 | Fassbender | 360/45 |
| 4,122,501 | 10/1978 | Sordello et al. | 360/51 |
| 4,146,743 | 3/1979 | Raynham | 178/69 |
| 4,344,039 | 10/1982 | Sugiura et al. | 329/50 |

*Primary Examiner*—Vincent P. Canney
*Attorney, Agent, or Firm*—Basile, Weintraub & Hanlon

[57] ABSTRACT

A clock signal synchronization apparatus for decoding self-clocking encoded data generates data signals identical in frequency with the encoded data but progressively offset in time with respect to the encoded data signal. The delayed data signals are responsive to the clock rate of a clock signal generating means so as to be advanced or delayed in time with respect to the encoded data when the clock signal generating means is not synchronized with the encoded self-clocking data. The instantaneous binary states of the encoded data and the delayed data signals are sampled in parallel to detect one of a predetermined number of distinct trigger codes. The signals are continuously sampled to detect a correct following code after the detected trigger code to indicate that the clock signal is synchronized with the encoded, self-clocking data. Error codes will be detected prior to the correct following code for each distinct trigger code when the clock signal is delayed or advanced with respect to the encoded data. The amount of time that an error code is present is used to vary the clock rate of the clock signal generating means to bring it into synchronization with the encoded self-clocking data.

8 Claims, 9 Drawing Figures

CLOCK SIGNAL SYNCHRONIZATION APPARATUS AND METHOD FOR DECODING SELF-CLOCKING ENCODED DATA

BACKGROUND OF THE INVENTION

1. Field of the Invention

This invention relates, in general, to magnetic data storage media and, more specifically, to apparatus and methods for decoding self-clocking encoded data from moving magnetic storage media.

2. Description of the Prior Art

In storing and retrieving binary data on magnetic storage media, i.e., magnetic tape, discs, etc., the binary data is stored and retrieved in a timed manner by means of a clock signal which is typically stored on a separate track on the magnetic storage media to insure proper decoding of the data. However, since this requires two separate tracks, data storage capacity is limited.

Various self-clocking encoding and modulation techniques have been devised to improve the storage capability of magnetic storage media. Such techniques produce an encoded signal which is stored on a single track on the magnetic storage media and which is a combination of the binary data signal and the clock signal. Upon retrival, the clock signal is synthesized from the encoded data signal and used to decode the data from the storage media.

A common self-clocking encoding technique is termed "modified frequency modulation" (MFM). In this encoding technique, the binary state of the encoded signal is reversed at the center of a bit cell or zone for a bit cell or zone having a logic one state and at the boundary between two consecutive data bits of logic zero. While this technique is effective at increasing the data storage capacity of magnetic storage media, MFM encoded data exhibits random peak shift between the logic bit reversals in the decoded data as well as noise and variations in the velocity of the magnetic storage media which are encountered with any type of data decoding apparatus. These problems introduce variations between the phase of the clock signal and the encoded data signal which leads to decoding errors since the clock decoding pulse is not centered on each bit cell or zone but maybe offset in either advanced or delayed directions from the center of each bit cell.

A number of circuits have been devised to accurately recover MFM encoded data from magnetic storage media. However, these previous attempts have utilized relatively complex circuits incorporating precision and, accordingly, expensive components.

Thus, it would be desirable to provide a clock signal synchronization apparatus for decoding self-clocking encoded data which overcomes the problems of previously devised clock signal synchronization apparatus. It would also be desirable to provide such a clock signal synchronization apparatus which is simple and inexpensive to construct. Finally, it would be desirable to provide such a clock signal synchronization apparatus which is specifically adapted for synchronizing a clock signal with MFM self-clocking encoded data.

SUMMARY OF THE INVENTION

There is disclosed a unique clock signal synchronization apparatus and method for decoding self-clocking encoded data from a moving magnetic storage media, such as a magnetic disc or tape. The apparatus which implements the disclosed method includes means for receiving the encoded data from a moving magnetic storage media. The apparatus also includes means for generating a plurality of data signals, identical to the encoded data t signal in frequency but each progressively offset in time with respect to the encoded data. The delayed data signals are generated from the received encoded data at the clock rate of the decoding clock signal.

The encoded data signal and the delayed data signals are continuously sampled in parallel as a binary code. The sampling means is configured to detect one of a plurality of predetermined distinct trigger codes comprised of a predetermined sequence of binary states of the encoded and delayed data signals. The sampling means also detects a correct following code after one of the predetermined trigger codes have been detected, with the correct following code being generated only when the clock decoding signal is synchronized with the self-clocking encoded data signal.

Error codes are detected when the decoding clock signal is advanced or delayed in time with respect to the encoded data signal. The amount of time that an error code is present before the proper following code is detected after a predetermined trigger code has occurred is applied to a synchronization circuit which advances or delays the clock signal with respect to the self-clocking encoded data signal so as to synchronize the decoding clock signal with the self-clocking encoded data signal such that subsequent trigger codes will be followed by the correct following code and not an error code.

In a preferred embodiment, four delayed data signals are generated. The sampling means also comprises a plurality of first logic means which continually sample the encoded data signal and the delayed data signals to detect one of plurality of trigger codes corresponding to a predetermined sequence of binary states of the encoded data signal and the delayed data signals.

A plurality of second logic means are also provided to detect the correct following code corresponding to a predetermined sequence of binary states of the encoded data signal and the delayed data signals after a predetermined one of the trigger codes has been detected. A plurality of third and fourth logic means are used to detect error codes after one of the predetermined trigger codes has been detected, with such error codes being generated prior to the occurrence of the correct following code after the one of the predetermined trigger codes has been detected.

The clock signal synchronization apparatus and method disclosed herein overcomes many of the problems encountered with previously devised clock synchronization apparatus for decoding self-clocking encoded data. The unique apparatus and method of the present invention incorporate the novel discovery that by sampling the binary state of the encoded self-clocking data simultaneously with the binary states of four delayed data signals, which are identical to the encoded data signal in frequency but offset in time with respect to the encoded data signal by a predetermined delay and further advanced or delayed with respect to the encoded self-clocking data signal by the clocking signal itself, a determination can be made as to how much the clocking signal should be advanced or delayed in order to bring it into synchronization with the self-clocking encoded data. The circuitry utilized to implement this discovery is both inexpensive and simple to construct.

Furthermore, the unique apparatus and method disclosed herein finds advantageous use with MFM self-clocking encoded data which exhibits random peak shift previously resulting in errors in the decoding of such data. The apparatus and method disclosed herein overcomes such deficiencies by continuously advancing or delaying the clock rate of the clock decoding signal so as to move the decoding signal continuously towards synchronization with the self-clocking encoded data signal to thereby minimize decoding errors.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Throughout the following description and drawing, an identical reference number is used to refer to the same component shown in multiple figures of the drawing.

In general, the present invention is directed toward a clock signal synchronization apparatus and method for decoding self-clocking encoded data. The apparatus and method of the present invention finds particular advantageous use with MFM encoded data and operates to adjust the clock rate of the clock decoding signal so as to synchronize the decoding signal with the self-clocking encoding data for preper data decoding from a moving magnetic storage media, such as a magnetic tape or disc.

Theory of Operation

Before describing the specific implementation of the clock synchronization apparatus and method of the present invention, a brief description of the theory of operation of the clock signal synchronization apparatus will be presented in order to provide a clear and concise understanding of the features of the present invention. In general, the clock signal synchronization apparatus receives the original MFM encoded data signal and generates therefrom a predetermined number of delayed data signals which are identical to the original encoded MFM data in frequency but delayed in time with respect to the encoded data signal. The delayed data signals are generated at the clock rate of the clock decoding signal so as to be responsive to advances or delays in the clocking signal with respect to the self-clocking MFM encoded data. Four delayed data lines are preferably generated in order to minimize the number of required circuit components as well as to provide a reliable indication of any advance or delay in the clock decoding signal rate with respect to the self-clocking MFM data.

The original MFM encoded data signal and the four delayed data signals are continuously read in parallel as a five bit binary code of the binary state of each of the signals at any predetermined instant in time.

It has been discovered that in sampling an MFM encoded data signal and four delayed data signals generated therefrom, twenty-three (23) possible five bit binary codes will be generated. Of the 23 possible five bit binary codes, only eight need be considered since the remaining fifteen codes occur in a natural state during the sampling of the MFM data and the delayed data signals without a leading clock pulse edge or are generated in the middle of a long continuous data pulse. Eight particular sets of 5 bit binary codes have been found which uniquely provide an indication of whether the clock decoding signal is advanced or delayed in time with respect to the self-clocking encoded data signal read from the magnetic storage media. The code sequences start with the detection of one of eight distinct five bit trigger codes comprised of the binary states of the encoded data signal and the four delayed data signals at any instance in time. If the clock decoding signal is synchronized with the encoded data signal, a distinct correct following five bit binary code will be detected next thereby indicating that the clock decoding signal is synchronized with the self-clocking encoded data.

If the clock decoding signal is not synchronized with the self-clocking encoded data signal, that is, the clock signal is advanced or delayed in time with respect to the self-clocking encoded data signal, error codes will be detected. It has been found that distinct error codes will be generated when the clock decoding signal is either advanced or delayed with respect to the self-clocking encoded data signal for each of the eight distinct trigger codes.

As the amount of time that any one of error codes exists before the correct following code is detected can be ascertained, the amount of advance or delay of the clock decoding signal with respect to the self-clocking encoded data signal can be determined and adjustments made to the clock rate of the clock decoding signal so as to bring it into synchronization with the encoded data signal.

Implementation

Figure 1:
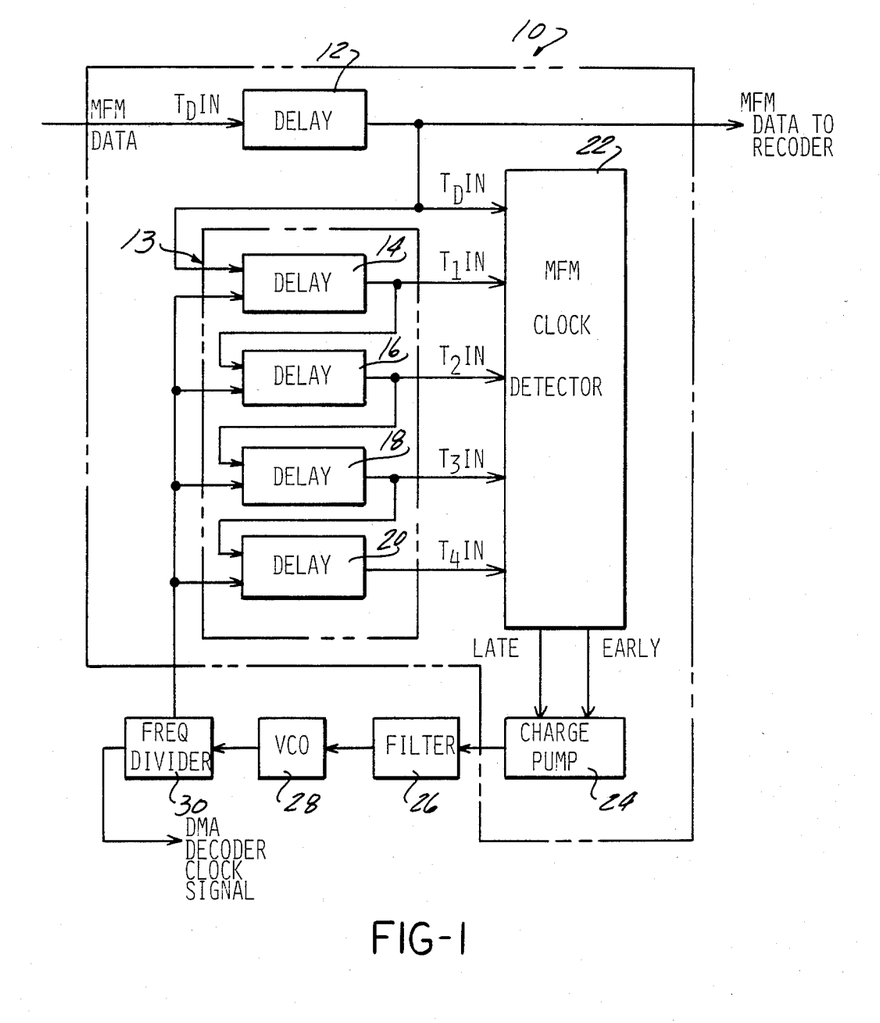
FIG. 1 is a block diagram of a clock signal synchronization apparatus constructed in accordance with the teachings of the present invention.

The specific implementation of the clock signal synchronization apparatus and method of the present invention will now be described. As shown in FIG. 1, the clock signal synchronization apparatus 10 which implements the unique method of the present invention includes a means 13 for generating a plurality of delayed data signals in response to the received MFM encoded data. The delayed data signals, which in a preferred embodiment constitute four delayed data signals, are input to an MFM clock detection circuit 22 along with the received MFM data signal which, is also preferably delayed for reasons which will become more apparent hereafter. The MFM clock, detection circuit 22 functions to detect the current binary state of the encoded MFM data signal and the four dalayed data signals and generates appropriate early and late signals if the clock rate of the clock decoding signal is not synchronized with the self-clocking MFM encoded data clock signal.

The late and early signals are applied to a charge pump circuit 24 which provides an indication of the amount of time that the early or late signals are in existence. The output of the charge pump 24 is applied to a conventional filter and integrator circuit 26 which outputs a control signal to a clock signal generating means 28, such as a variable control oscillator. A frequency divider network 30 receives the output of the clock signal generating means or variable controlled oscillator 28 to provide the clock signal used to decode the MFM data from the moving storage media. In this manner, if the clock decoding signal is properly synchronized with the encoded data, the late or early error code signals will not be generated and the clock signal generating means will remain at the same clock rate. If an error code is detected, however, the amount of time that the error code is present will cause a change to be made to the clock rate of the clock signal generating means which will adjust the clock rate so as to bring it into synchronization with the self-clocking MFM encoded data.

As shown in FIG. 1, the MFM data is received from a moving storage media by a delay network 12 which provides a predetermined time delay. The output of the delay network 12, labelled "$T_D IN$", is input to the MFM clock detector circuit 22. As shown more clearly in FIG. 2, the delay network 12 comprises a single shot 32 which receives the MFM encoded data from the storage media. The output of the single shot 32 is input to a flip flop 34, whose output follows the state of the binary sequence of the MFM data but is delayed in time by a fixed amount.

Figures 2, 6, 7:
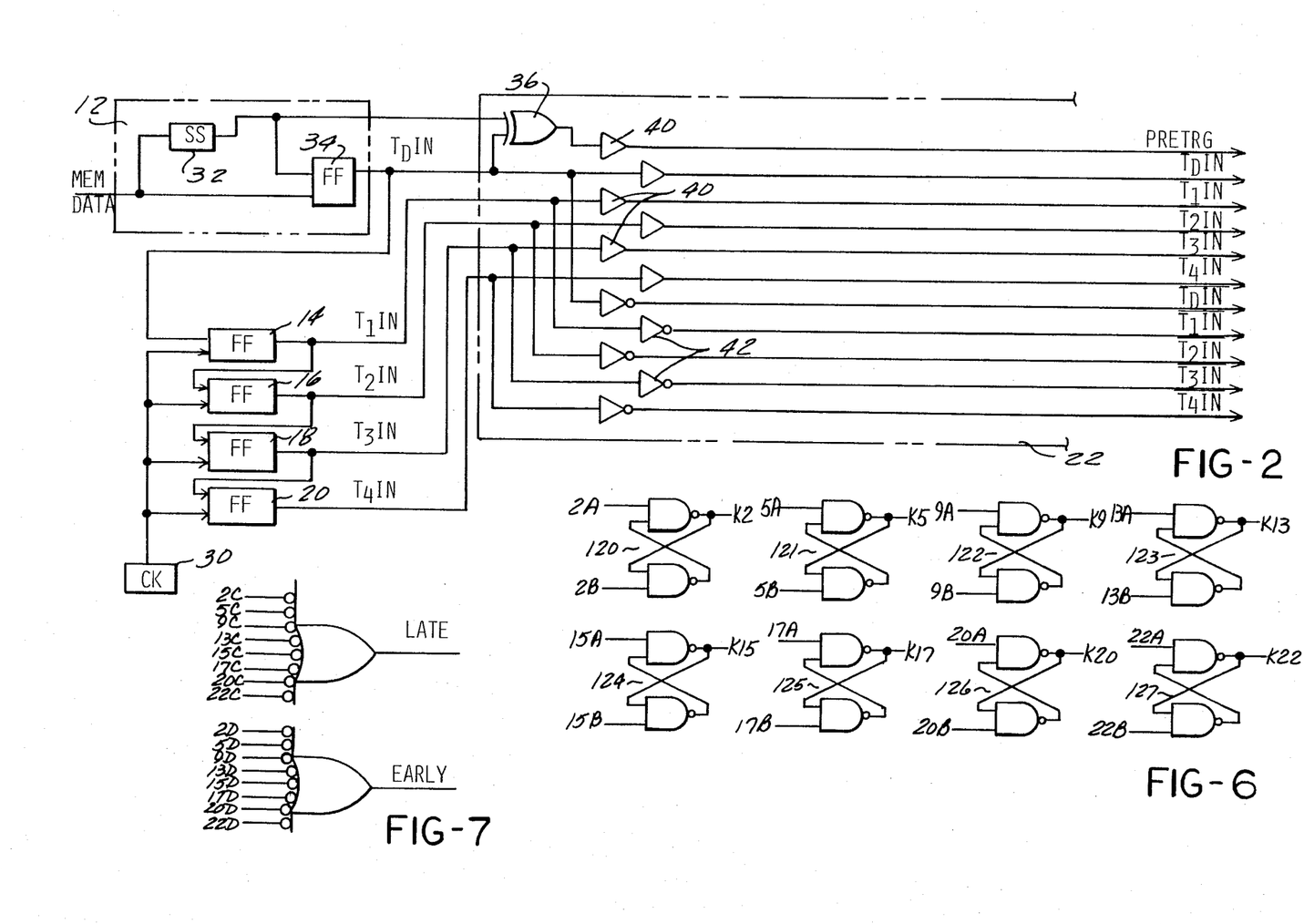
FIG. 2 is a circuit diagram of the delayed data signal generating means.
FIG. 6 is a circuit diagram of the code sequence circuit.
FIG. 7 is a circuit diagram illustrating the means for generating the early and late synchronization signals.

As also shown in FIG. 2, the MFM data as well as the output of the flip flop 34 are input to an exclusive OR gate 36 whose output provides a signal through amplifier 40 labelled "PRETRG". This signal is used to differentiate certain sequences of trigger and correct following codes which may have the same trigger or following code.

The clock signal synchronization apparatus 10 of the present invention also includes means 13 which are responsive to the received encoded MFM data signal and the clock signal generator means 28 for generating a plurality of separate data signals which are identical in frequency to the received MFM encoded data but are progressively delayed in time with respect to the received MFM encoded data. For reasons of optimum utilization of components, four delayed data signals are generated. However, it will be understood that any number of delayed data signals may be utilized to practice the present invention.

As shown in FIG. 1 and in greater detail in FIG. 2, the means 13 for generating the plurality of delayed data signals comprises four discrete delay elements 14, 16, 18 and 20. The output of the first delay element 14 receives the delayed encoded data signal from the delay element 12. The output of each of the delay elements 14, 16, and 18 is input to the following delay element 16, 18 and 20, respectively. A clocking pulse is provided by the frequency divider 30 which receives the output of the clock signal generating means or variable controlled oscillator 28 so as to progressively clock the data signals through the delay elements 14, 16, 18 and 20 at the clock rate of the oscillator 28.

As shown in FIG. 2, the delay elements comprise individual flip flops in which the output of each flip flop is connected to an input of the following flip flop. The output of each flip flop 14, 16, 18 and 20 generates an individual delayed data signal respectively labelled "$T_1 IN$", "$T_2 IN$", "$T_3 IN$" and "$T_4 IN$" which is input to the MFM clock detector 22.

Figure 3:
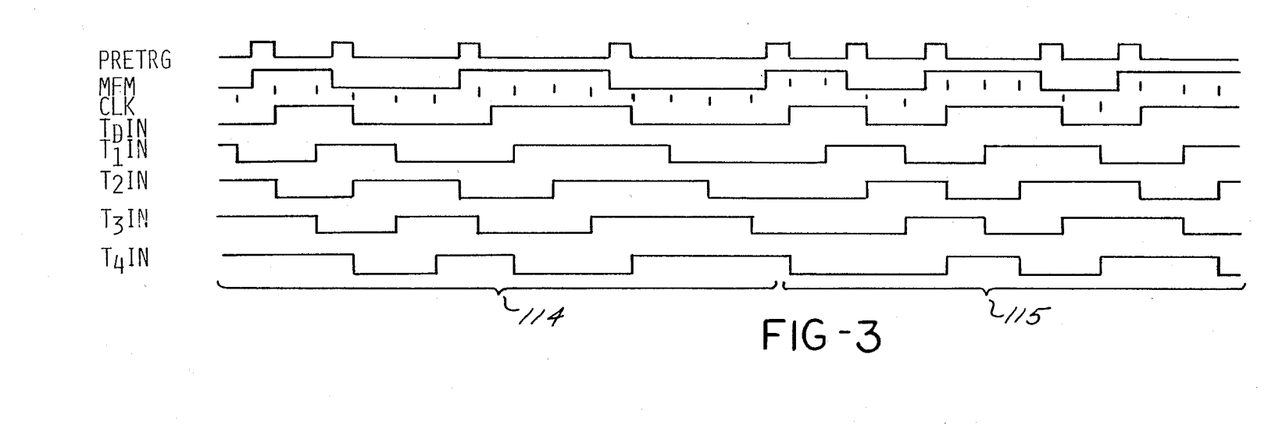
FIG. 3 is a representative waveform diagram illustrating the various signals utilized in the clock signal synchronization apparatus of the present invention.

The offset in time of these delayed data signals with respect to the delayed MFM data signal is more clearly illustrated in FIG. 3 which depicts the offset waveforms of a representative MFM data signal, the delayed MFM data signal and four delayed data signals. As shown in FIG. 3, each of the delayed data signal $T_D IN$ and the remaining delayed data signals $T_1 IN$–$T_4 IN$ are identical in frequency but are offset in phase by a predetermined amount which corresponds to the delay inherent in the operation of each flip flop 14, 16, 18 and 20. Furthermore, as will be explained in greater detail hereafter, each of the delayed data signals $T_1 IN$–$T_4 IN$ is further advanced or delayed in time with respect to the delayed signal $T_D IN$ by any difference between the clock decoding signal rate and the self-clocking encoded MFM data.

The output of each flip flop 14, 16, 18 and 20 is applied to a driver 40 and an inverter 42, as shown in FIG. 2, to generate a series of data lines labelled $T_1 IN$–$T_4 IN$ and $\overline{T_1 IN}$–$\overline{T_4 IN}$.

As noted above in the description of the theory of operation of the present clock signal synchronization apparatus 10, eight out of a possible 23 five bit binary codes have been identified as being an indicator of a possible variance between the clock rate of the clock signal generating means 28 and the encoded data signal. The eight distinct five bit trigger codes are illustrated in CHART #1 shown on page 20. These eight distinct trigger codes are labelled "A" and, if the clock decoding signal is properly synchronized with the self-clocking encoded data, will be successively followed by a distinct correct following code labelled "B".

In the event that the clock decoding signal is advanced or delayed in time with respect to the self-clocking encoded MFM data signal, late or early error codes will be generated. The late and early error codes are respectively labelled "C" and "D" and are also illustrated in CHART #1 for each of the distinct trigger codes "A".

The clock signal generating apparatus 10 of the present invention includes means for continuously sampling the encoded data signal and the plurality of delayed data signals in parallel to detect the occurrence of one of the predetermined trigger codes corresponding to the particular binary state of the encoded data signal and the delayed data signals at any one instant in time. Means are also provided for sampling the encoded data signal and the plurality of delayed data signals after one of predetermined trigger codes has been detected to detect the occurrence of the correct following code. Also, means are provided for sampling the encoded data signal and the plurality of delayed data signals to detect one of the late or early codes which may be generated after a particular trigger code has been detected if the clock decoding signal is delayed or advanced in time, respectively, with respect to the self-clocking encoded MFM data signal.

In a preferred embodiment, as noted above, the means 13 for generating the plurality of delayed data signals comprises means for generating four, time offset, delayed, data signals. Thus, the means for sampling the encoded data and the four delayed data signals comprises a plurality of first means, each of which receives as inputs specific ones of the binary states of the encoded data signals and delayed data signals.

Figure 4A:
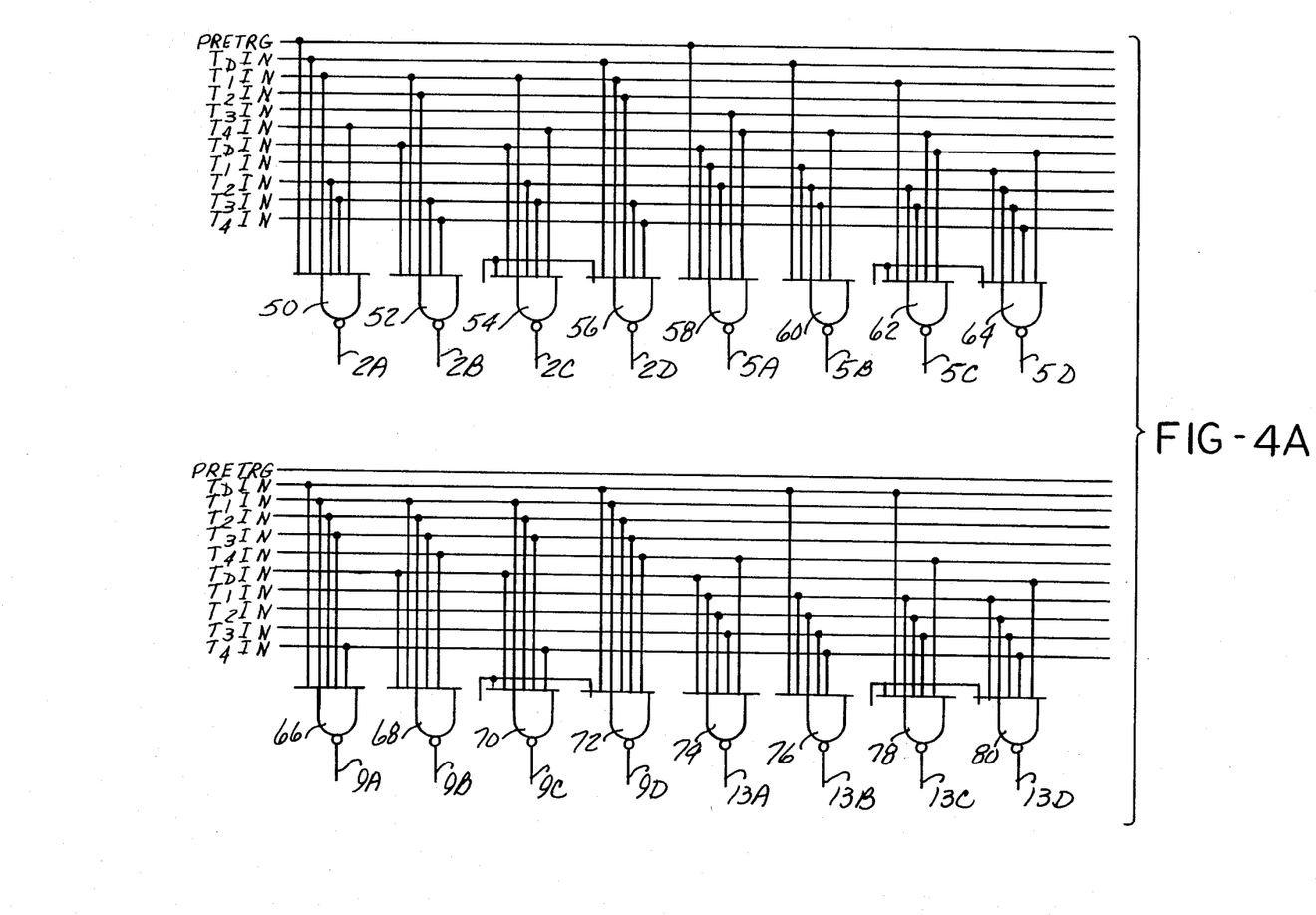
FIGS. 4A and 4B are circuit diagrams illustrating the means for continuously sampling the encoded and delayed data signals.
Figure 4B:
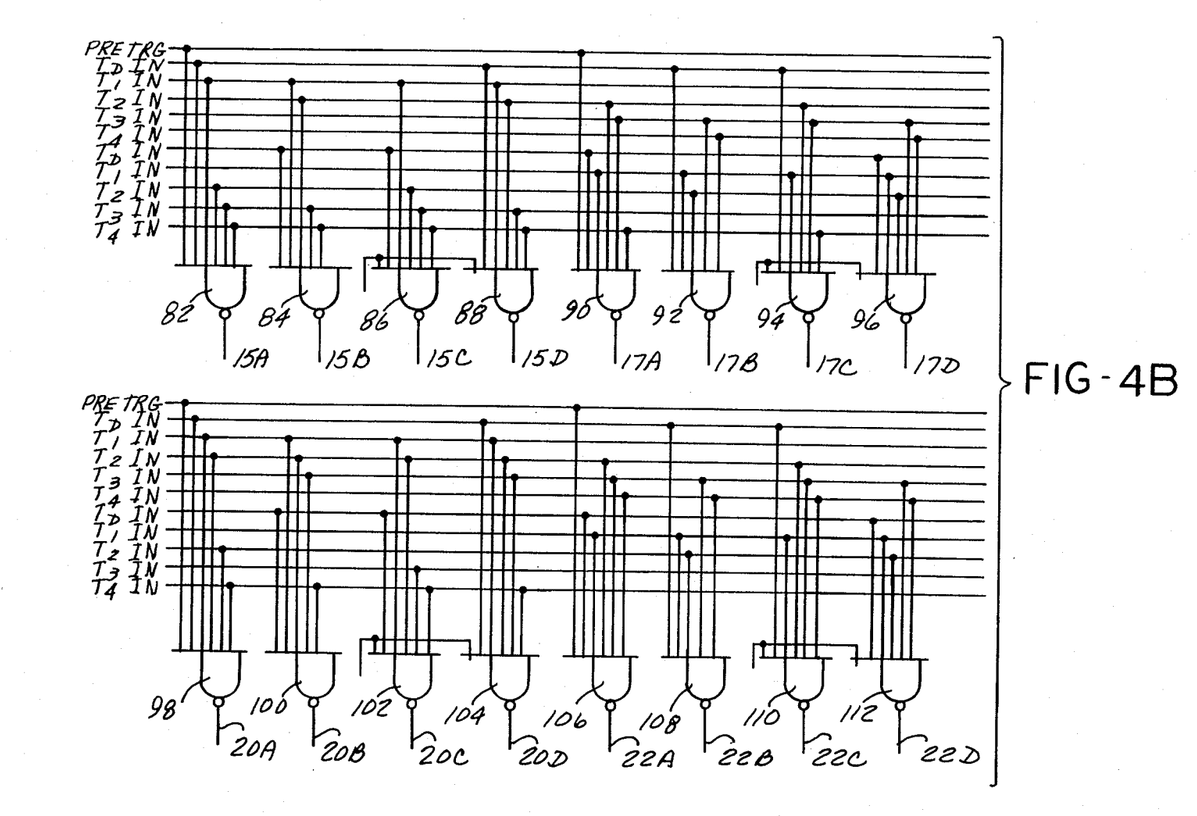

As shown in FIGS. 4A and 4B, the first means preferably comprises a logic NAND gate which has as inputs the various data signals and generates an output when the appropriate binary sequence of the inputs is detected. Thus, the first means comprises NAND gates 50, 58, 66, 74, 82, 90, 98 and 106. The inputs from the various encoded and delayed data signals $T_DIN$ and $T_1IN$-$T_4IN$, as well as inverted signals $\overline{T_DIN}$ and $\overline{T_1IN\text{-}T_4IN}$, are connected in the appropriate manner as inputs to the first logic NAND gates corresponding to each of the eight trigger codes shown in CHART #1. For example, inputs $T_DIN$, $T_1IN$, $T_2IN$, $T_3IN$ and $T_4IN$ are connected to NAND gate 50 to detect the trigger code "A" of 11001. When one of the appropriate trigger codes "A" is detected by one of the first logic NAND gates, the output of that particular gate will go low thereby providing indication that one of the predetermined trigger codes "A" has been detected.

A plurality of second means for detecting the correct following code "B" which will occur after one of the predetermined trigger codes "A" has been detected if the clock decoding signal is properly synchronized with the self-clocking MFM encoded data are also provided. As with the first means, the second means comprises a plurality of logic NAND gates 52, 60, 68, 76, 84, 92, 100 and 108. The inputs to these second logic means are comprised of the respective encoded data signal and delayed data signals labelled "B" in CHART #1. When the correct following code "B" is detected successively after one of the predetermined trigger codes "A", one of the second logic NAND gates will generate an output indicating the detection of the correct following code.

Third and fourth logic means are also provided for detecting the occurrence of a late or early code, "C" or "D", respectively. As before, each of the third and fourth means comprises a plurality of logic means or NAND gates which have as inputs respective ones of the encoded and delayed data signals in order to detect the late or early code. Thus, the third logic means comprises NAND gates 54, 62, 70, 78, 86, 94, 102 and 110. The fourth logic means comprises logic NAND gates 56, 64, 72, 80, 88, 96, 104 and 112.

Lastly, the clock signal generating apparatus 10 and method of the present invention includes means for synchronizing the clock signal generating means 28 with the encoded data signal. As noted above and illustrated in FIG. 1, the synchronizing means comprises the charge pump circuit 24 and the filter 26 which are operative to vary the frequency of the clock signal generating means 28 or variable controlled oscillator in proportion to the amount of time any late or early signal is present.

If the clock signal generating means 28 is properly synchronized with the self-clocking encoded data, a detected trigger code "A" will be immediately followed by a correct following code "B". In this instance, no alteration to the frequency of the clock signal generating means 28 need be made. However, if an error signal, either late or early, is detected by the third or fourth logic means, this indicates that the clock signal generating means 28 is out of synchronization with the encoded data such that alterations must be made to the clock rate of the clock signal generating means in order to bring it into proper synchronization with the encoded data signal. Such a timing error could occur if the clock rate of the clock signal generating means 28 is advanced or delayed in time with respect to the self-clocking, encoded data signal.

Figure 5A:
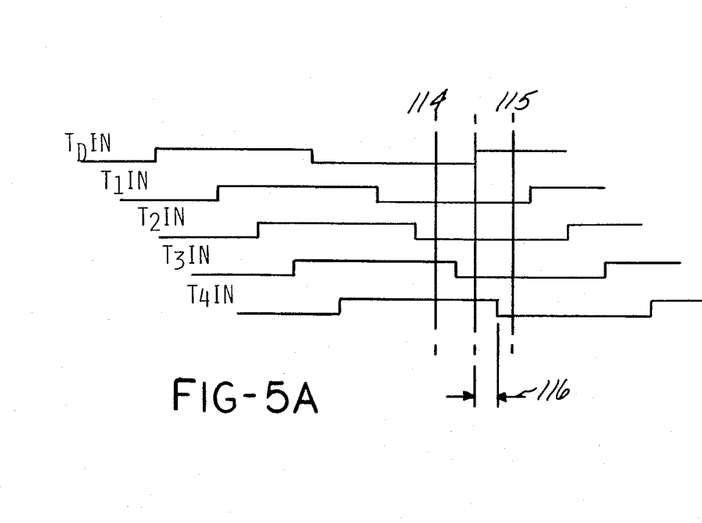
FIGS. 5A and 5B are enlarged waveform diagrams of a portion of the waveforms illustrated in FIG. 3 showing the waveforms of the delayed data signals when such signals are advanced or delayed in time with respect to the encoded data signal.
Figure 5B:
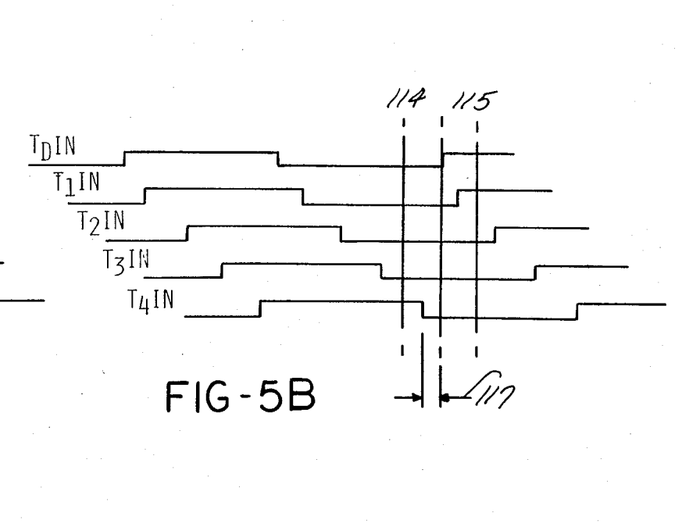

A representative example of a typical sequence of trigger, correct following and late and early code detection waveforms is depicted in FIGS. 3, 5A and 5B. In FIG. 3, two successive bit cells or zones 114 and 115 are illustrated. Such bit cells or zones do not physically exist but are illustrative of the time frame in which the clock decoding signal will be generated. Ideally, the clock signal will be generated at the precise middle of each cell or zone.

As shown in FIG. 3, sampling of data signals $T_DIN$-$T_4IN$ in bit cell 114 will detect a trigger code "A" or 00001, number 13 on CHART #1. This code will be detected by NAND gate 74, FIG. 4A, whose output will go low when the trigger code "A" is detected.

As shown in FIG. 6, the output of NAND gate 74 is input to a switch means or flip flop 120 and will set the flip flop 120 when the trigger code is detected. The outputs of the remaining NAND gates 58, 66, 74, 82, 90, 98 and 106 of the first logic means are also input to individual flip flots 121–127, respectively. The output of each NAND gate 52, 60, 68, 76, 84, 92, 100 and 108 are also connected to the flip flops 120–127, respectively, and function to reset each flip flop when the correct following code "B" is detected after a trigger code "A".

If the clock signal is in synchornization with the encoded data signal, the next code to be detected will be the correct following code "B" of 10001 in bit cell 115, as shown in FIG. 3. This is detected by NAND gate 76, the output of which will reset flip flop 120.

However, if the clock signal generating means is delayed in time with respect to the encoded data signal, the delayed data signals $T_1IN$-$T_4IN$ will be delayed in time with respect to the delayed input MFM data signal $T_DIN$ by a predetermined amount of time as indicated by reference number 116 in FIG. 5A. This will offset by a predetermined amount the delayed data signals from the delayed MFM data signal $T_DIN$ so as to result in the occurrence during bit cell or zone 115 of the late error code "C" 00000. This will be detected by the third logic means, specifically, NAND gate 78, which will generate an output indicating the occurrence of a late error code "C". As shown in FIGS. 4A and 4B, the output of each flip-flop 120–127 is connected as an input to the respective NAND gate of the third and fourth logic means for each predetermined trigger code. Thus, for example, the output of flip flop 123 is connected as an input to NAND gates 78 and 80 in FIG. 4A. In this manner, the detection of a trigger code "A" will set its associated flip flops 120–127 and arm its associated late and early code detector gates for detecting a late or early code following a trigger code. A correct following code "B" occurring immediately after a trigger code "A" will reset the flip flops 120–127 such that no error code will be detected.

Conversely, the clock generating signal could be advanced in time with respect to the encoded data signal so as to advance the delayed data signals with respect to the delayed MFM data signal $T_DIN$ as shown in FIG. 5B. In the instance, the delayed data signals are advanced in time with respect to the MFM encoded data signal $T_DIN$ in each of the bit cells or zones 114 and 115. Thus, a five bit early code "D" of 00001 will be detected in bit cell or zone 114 which will be detected by the fourth logic means, specifically NAND gate 80.

Referring now to FIG. 7, there is illustrated a portion of a means for synchronizing the clock signal generating means 28 with respect to the encoded data signal.

As shown in FIG. 7, the output of each NAND gate 54, 62, 70, 78, 86, 94, 102 and 110 which detect a late error code "C" are input to a NOR gate 130. Similarly, the output of NAND gates 56, 64, 72, 80, 88, 96, 104 and 112 which detect early codes "D" are input to NOR gate 132. Thus, the detection of a late or early error code will cause a logic one output to be generated by one of the NOR gates 130 or 132.

The amount of time that an output from one of the NOR gates 130 or 132 is present will be determined by the amount of time between the generation of one of the late or early codes "C" or "D" before the correct following code "B" is detected. This provides an indication of the amount of error between the synchronization of the clock generating signal and the self-clocking encoded data signal. When the correct following code "B" is detected, the associated flip flop 120–127 will be reset so as to switch the outputs of the NOR gate 130 or 132 to its reverse state.

The outputs of the NOR gates 130 and 132 are applied to the charge pump 24, FIG. 1, which generates a signal corresponding to the length of time that any one of the inputs is applied thereto. The output of the charge pump 24 is applied to the filter and integrating circuit 26 which adjusts the clock rate of the clock signals generating means 28. The amount of time that any one of the late or early error codes is present is translated into an appropriate amount of electric charge which is utilized to vary the frequency of the signal generating means 28 so as to adjust its clock rate into synchronization with the self-clocking encoded MFM data signal in order to provide proper decoding of the MFM encoded data.

In summary, there has been disclosed a clock signal synchronizing apparatus and method for decoding self-clocking encoded data which overcomes many of the problems associated with previously devised clock synchronization apparatus. The clock synchronization apparatus of the present invention makes use of unique binary codes which are generated by the output of the encoded data signal and a plurality of delayed data signals which are generated from the encoded data but are offset in time with respect to the encoded data. In this manner, variations, such as an advance or delay in the clock rate of the clock generating signal with respect to the encoded data signal, can be detected such that adjustments in the clock rate of the clock generating signal may be made to bring it into synchronization with the self-clocking, encoded data signal.

The clock synchronization apparatus of the present invention is simple and inexpensive to implement and is particularly suited for use with synchronizing a clock signal from MFM self-clocking encoded data.

CHART #1

| | TRIGGER CODE "A" | FOLLOWING CODE "B" | LATE CODE "C" | EARLY CODE "D" |
|---|---|---|---|---|
| 1. | 10000 | 11000 | — | — |
| 2. | 11001 | 01100 | 01001 | 11100 |
| 3. | 01100 | 00110 | — | — |
| 4. | 00110 | 00011 | — | — |
| 5. | 00011 | 10001 | 10011 | 00001 |
| 6. | 10001 | 11000 | — | — |

CHART #1-continued

| | TRIGGER CODE "A" | FOLLOWING CODE "B" | LATE CODE "C" | EARLY CODE "D" |
|---|---|---|---|---|
| 7. | 11000 | 11100 | — | — |
| 8. | 11100 | 11110 | — | — |
| 9. | 11110 | 01111 | 01110 | 11111 |
| 10. | 01111 | 00111 | — | — |
| 11. | 00111 | 00011 | — | — |
| 12. | 00011 | 00001 | — | — |
| 13. | 00001 | 10000 | 10001 | 00000 |
| 14. | 10000 | 11000 | — | — |
| 15. | 11000 | 01100 | 01000 | 11100 |
| 16. | 01100 | 00110 | — | — |
| 17. | 00110 | 10011 | 10110 | 00011 |
| 18. | 10011 | 11001 | — | — |
| 19. | 11001 | 11100 | — | — |
| 20. | 11100 | 01110 | 01100 | 11110 |
| 21. | 01110 | 00111 | — | — |
| 22. | 00111 | 10011 | 10111 | 00011 |
| 23. | 10011 | 11001 | — | — |

What is claimed is:

1. An apparatus for synchronizing a clock signal generating means with self-clocking encoded data output from a moving storage medium comprising:
   means for receiving the self-clocking encoded data from the storage medium;
   means, responsive to the received encoded data and the clock signal generating means, for generating a plurality of separate delayed data signals, each identical in frequency to the received encoded data but progressively delayed in time with respect to the received encoded data;
   means for continuously sampling the encoded data and the plurality of delayed data signals in parallel to detect one of a plurality of predetermined trigger sequences of binary states of the encoded data and the plurality of delayed data signals;
   means for sampling the encoded data and the plurality of delayed data signals after one of the predetermined trigger sequences of signals has been detected to detect a correct following sequence of signals for the detected trigger signal;
   means for sampling the encoded data and the plurality of delayed data signals after one of the predetermined trigger codes has been detected to detect one of a third and fourth sequence of binary states of the encoded data and the plurality of delayed data signals, the third and fourth sequences of signals corresponding to a delayed or advanced clock rate of the clock signal generating means with respect to the self-clocking encoded data for each detected trigger sequence; and
   means for synchronizing the clock signal generating means with respect to the self-clocking encoded data in proportion to the amount of time between the occurrence of one of the third and fourth binary sequences and the occurrence of the second sequence of binary codes after one of the trigger sequences has been detected.

2. The clock signal synchronizing apparatus of claim 1 wherein the means for generating a plurality of delayed data signals comprises means for generating four delayed data signals.

3. The clock signal synchronizing apparatus of claim 1 wherein the means for generating a plurality of separate data signals comprises:
   a plurality of data signal delayed means;

the first delayed means receiving the self-clocking encoded data as an input;

the other delay means receiving as an input the output of the preceding delay means; and the first delayed means being responsive to the clock-signal generating means such that the output of each delay means switches to the state of the data input thereto at the clock rate of the clock-signal generating means, the delay means each generating an output data signal after a predetermined time delay, the output data signal being identical in frequency with the encoded data but progressively offset in time, with the time offset being proportional to the clock rate of the clock signal generating means.

4. The clock signal synchronizing apparatus of claim 3 wherein the sampling means comprises:

a plurality of first means for sampling each of the encoded data and the plurality of delayed data signals in parallel, the first means generating an output of a predetermined binary state when one of a predetermined number of distinct trigger sequences of binary states of the encoded data and delayed signals is detected;

a plurality of second means for sampling each of the encoded data and the plurality of delayed data signals in parallel, the second means generating an output of a predetermined binary state when one of a predetermined number of correct following sequences, each corresponding to the detected distinct trigger sequence, is detected;

a plurality of third means for sampling each of the encoded data and the plurality of data signals and parallel, the third means generating an output of a predetermined binary state when one of a predetermined number of first error sequences, each corresponding to the detected trigger sequence, is detected, the first error sequence indicating that the clock rate of the clock signal generating means is delayed in time with respect to the self-clocking encoded data; and a plurality of fourth means for sampling each of the encoded data and the plurality of delayed data signals in parallel, the fourth means generating an output of a predetermined binary state when one of a predetermined number of second error sequences, each corresponding to the detected trigger sequence, is detected, the second error signals indicating that the clock rate of the clock signal generating means is advanced in time with respect to the self-clocking encoded data.

5. The clock signal synchronizing apparatus of claim 4 wherein the first, second, third and fourth means each comprises:

a plurality of logic means having selected ones of the encoded data and the plurality of delayed data signals connected as inputs thereto to respectively detect the occurrence of one of the distinct trigger, correct following, first error and second error sequences.

6. The clock signal synchronizing apparatus of claim 5 wherein a distinct correct following sequence, first error sequence and a second error sequence are associated with each of the distinct trigger sequences.

7. The clock signal generating apparatus of claim 4 further including:

switch means, responsive to the first and second means, for generating an output of a first binary state when an output is received from the first means, the switch means being reset to a second state when an output is received from the second means;

the switch means switching to a second opposite binary state when receiving an output from the second means;

the output of the switch means being input to the respective third and fourth means.

8. A method for synchronizing a clock signal generating means with self-clocking encoded data output from a moving storage medium comprising the steps of:

receiving the self-clocking encoded data from the moving storage medium;

generating a plurality of data signals from the received encoded data, each of the generated data signals being identical to the received encoded data in frequency, but progressively delayed in time;

continuously sampling the encoded data and the plurality of delayed data signals in parallel to detect one of a plurality of predetermined distinct trigger sequences of binary states of the encoded data and the plurality of data signals;

sampling the encoded data and the plurality of delayed data signals after one of the predetermined trigger sequences has been detected to detect a correct following sequence of binary states of the encoded data and the plurality of delayed data signals;

sampling the encoded data and the plurality of delayed data signals after one of the trigger sequences has been detected to detect the occurrence of a first and second error sequence of binary states of the encoded data and the plurality of delayed data signals, the first and second error sequences being generated when the clock rate of the clock signal generating means is delayed or advanced in time with respect to the self-clocking encoded data; and synchronizing the clock signal generating means with respect to the self-clocking encoded data in proportion to the amount of time between the occurrence of one of the first and second error signals and the occurrence of the second sequence after one of the distinct trigger sequences has been detected.

* * * * *